(12) United States Patent
Huang

(10) Patent No.: US 7,165,815 B1
(45) Date of Patent: Jan. 23, 2007

(54) WHEEL ASSEMBLY FOR GARDEN SHEARS

(76) Inventor: Li-Ting Huang, 5F, No. 371, Juguang Rd., Yuanlin Zhen, Chang Hua Hsien (TW)

( * ) Notice: Subject to any disclaimer, the term of this patent is extended or adjusted under 35 U.S.C. 154(b) by 0 days.

(21) Appl. No.: 10/823,135

(22) Filed: Apr. 12, 2004

(51) Int. Cl.
  *B60B 23/00* (2006.01)
(52) U.S. Cl. ............. 301/111.01; 301/113; 301/111.03; 301/111.05; 16/38
(58) Field of Classification Search ........... 301/111.01, 301/113, 115, 111.03, 111.04, 111.05, 111.06, 301/5.1; 16/44, 45, 46, 38, 31 R; 280/43.24; 190/18 A
See application file for complete search history.

(56) References Cited

U.S. PATENT DOCUMENTS

| | | | | |
|---|---|---|---|---|
| 4,530,543 A | * | 7/1985 | Keane | 301/64.707 |
| 5,188,430 A | * | 2/1993 | Chiu | 301/111.01 |
| 5,390,394 A | * | 2/1995 | Huang | 16/30 |
| 5,466,051 A | * | 11/1995 | Liao | 301/111.06 |
| 5,598,605 A | * | 2/1997 | Tomasiak | 16/45 |
| 5,902,018 A | * | 5/1999 | Owen et al. | 301/111.04 |
| 6,231,130 B1 | * | 5/2001 | Chang | 301/111.05 |
| 6,361,121 B1 | * | 3/2002 | Morris | 301/112 |
| 6,508,518 B1 | * | 1/2003 | Owen et al. | 301/111.03 |

* cited by examiner

*Primary Examiner*—Frantz F. Jules
(74) *Attorney, Agent, or Firm*—Alan D. Kamrath; Nikolai & Mersereau, P.A.

(57) ABSTRACT

A wheel assembly includes a main body, two wheels, two positioning shafts, and two retaining rods. In practice, the retaining portion of each of the retaining rods is urged on the positioning plates of the respective positioning shaft to position the locking portion of each of the positioning plates on the inner side the respective pivot hole of the main body so as to lock each of the two positioning shafts on the main body, so that each of the two wheels is attached on the main body rigidly and stably, thereby preventing the two wheels from detaching from the main body during a long-term utilization.

7 Claims, 5 Drawing Sheets

WHEEL ASSEMBLY FOR GARDEN SHEARS

BACKGROUND OF THE INVENTION

1. Field of the Invention

The present invention relates to a wheel assembly, and more particularly to a wheel assembly for long-arm garden shears available for shearing the lawn of a smaller area.

2. Description of the Related Art

A conventional wheel assembly for long-arm garden shears in accordance with the prior art shown in FIGS. 4 and 5 comprises a main body 10 having two opposite sides each formed with a pivot hole 11 having an outer side formed with a resting portion 12, a support shaft 20 extended through the pivot holes 11 of the main body 10 and having two ends each protruding outward from the main body 10, and two wheels 30 each secured on the support shaft 20 and each having an inner side formed with a resting portion 32 rested on the resting portion 12 of the respective pivot hole 11 of the main body 10. Each of the two wheels 30 has a center formed with a locking recess 31 for locking the support shaft 20 in a close fit manner.

However, each of the two wheels 30 is mounted on the support shaft 20 in a close fit manner, so that the two wheels 30 are easily detached from the support shaft 20 during a long-term utilization. In addition, the two wheels 30 are fixed on the support shaft 20 and are rotated in concert with each other, so that the two wheels 30 easily interfere with each other when the main body 10 is turned, thereby limiting the turning movement of the main body.

SUMMARY OF THE INVENTION

The primary objective of the present invention is to provide a wheel assembly for long-arm garden shears available for shearing the lawn of a smaller area.

Another objective of the present invention is to provide a wheel assembly, wherein the retaining portion of each of the two retaining rods is urged on the positioning plates of the respective positioning shaft to closely position the locking portion of each of the positioning plates on the inner side the respective pivot hole of the main body so as to lock each of the two positioning shafts on the main body, so that each of the two wheels is attached on the main body rigidly and stably, thereby preventing the two wheels from detaching from the main body during a long-term utilization.

A further objective of the present invention is to provide a wheel assembly, wherein each of the two wheels is attached on the main body by limit of the respective positioning shaft, so that each of the two wheels is rotatable on the main body smoothly and conveniently.

A further objective of the present invention is to provide a wheel assembly, wherein the two wheels are respectively attached on the main body in an independent manner, so that the two wheels will not interfere with each other when the main body is turned, thereby facilitating movement of the main body.

In accordance with the present invention, there is provided a wheel assembly, comprising a main body, two wheels, and two positioning shafts, wherein:

the main body has two opposite sides each formed with a pivot hole;

each of the two wheels is rotatably mounted on the main body and has a center formed with a step-shaped positioning hole;

each of the two positioning shafts is mounted on a respective one of the two wheels and is combined with the main body;

each of the two positioning shafts has a first end formed with a plurality of elastic positioning plates each extended through the positioning hole of the respective wheel and the respective pivot hole of the main body and each having a distal end formed with a hook-shaped locking portion locked on an inner side the respective pivot hole of the main body to lock each of the two positioning shafts on the main body.

Further benefits and advantages of the present invention will become apparent after a careful reading of the detailed description with appropriate reference to the accompanying drawings.

DETAILED DESCRIPTION OF THE INVENTION

Figure 1:
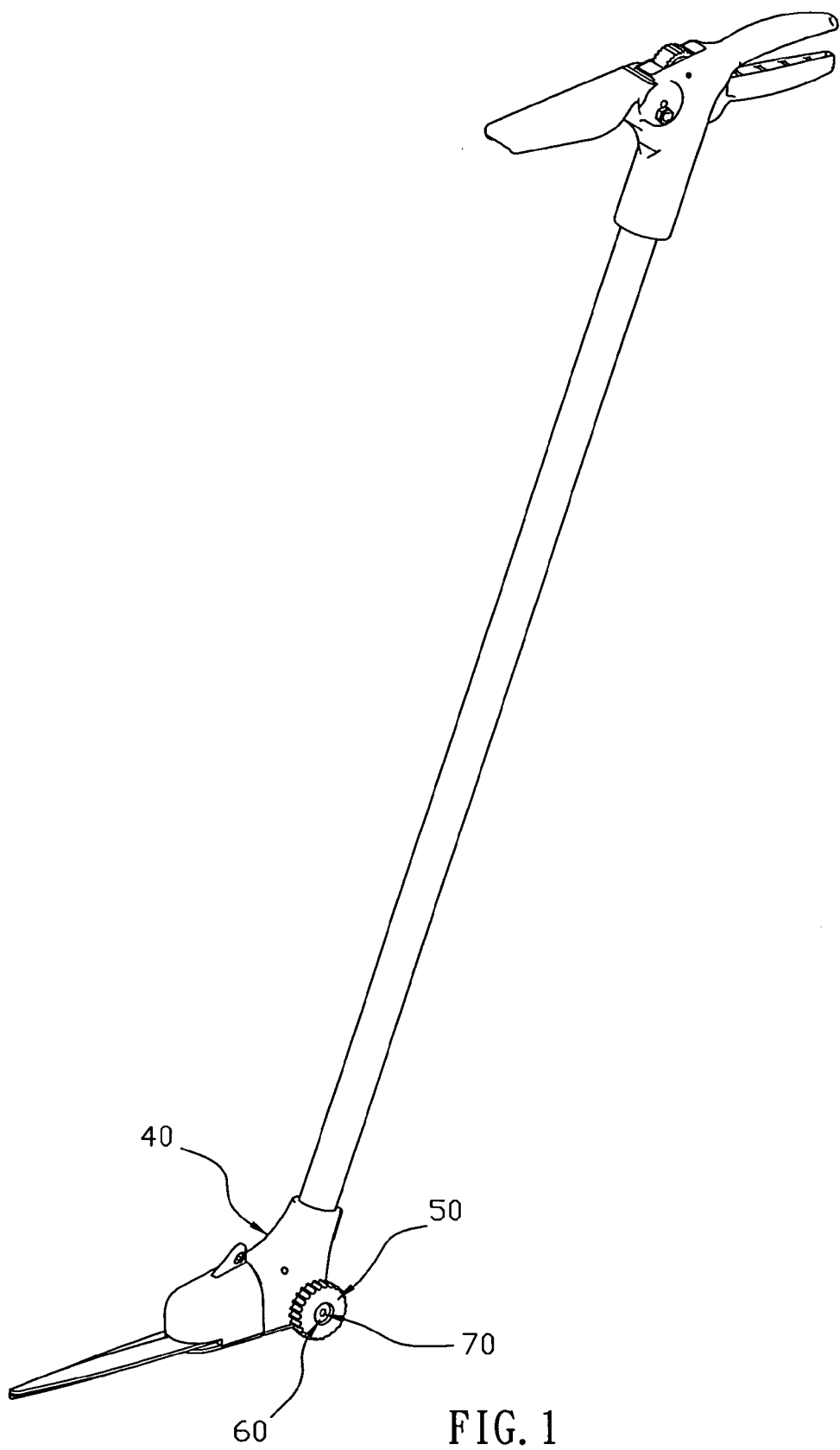
FIG. 1 is a perspective view of a wheel assembly for garden shears in accordance with the preferred embodiment of the present invention.
Figure 2:
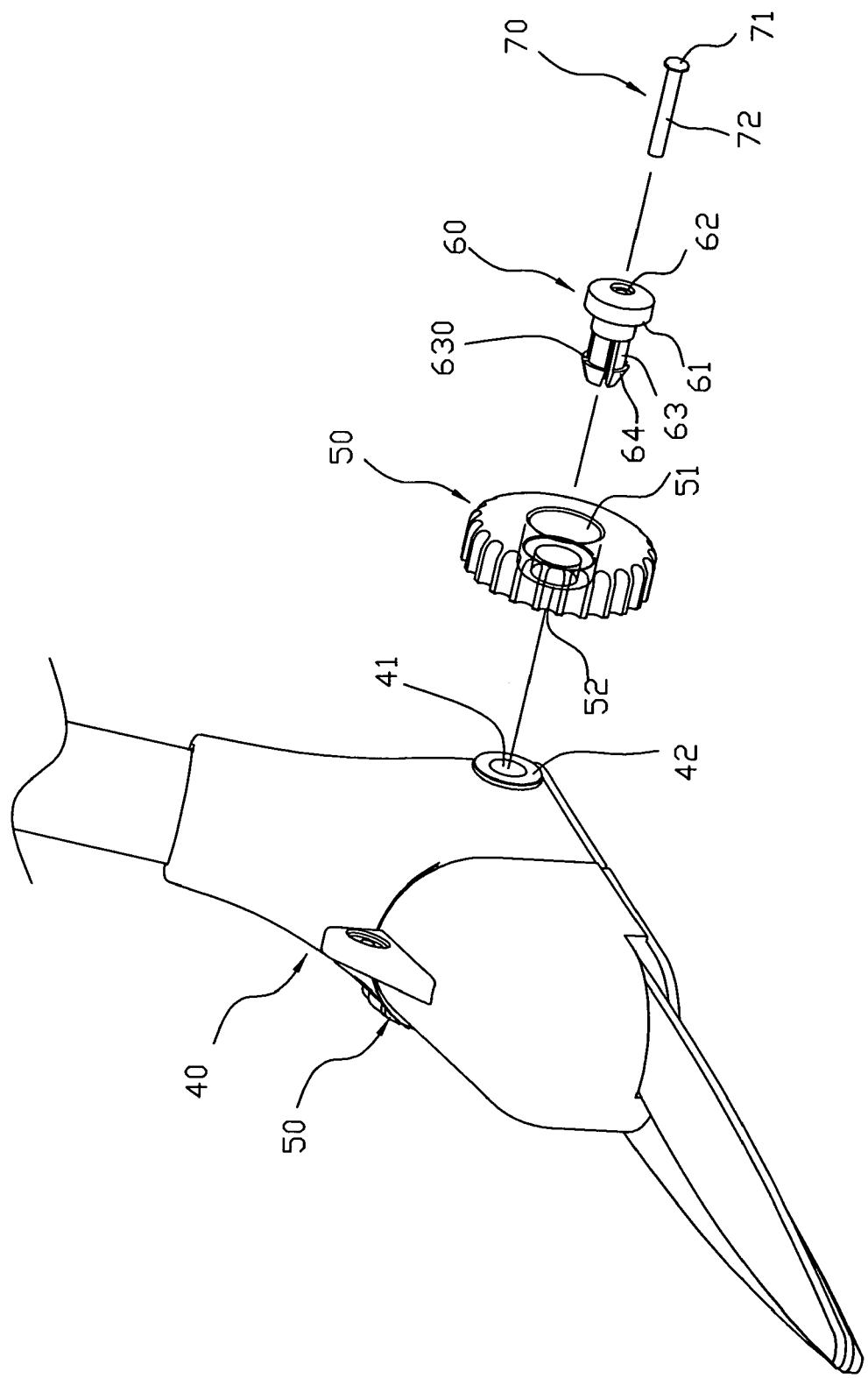
FIG. 2 is a partially exploded perspective view of the wheel assembly as shown in FIG. 1.

Referring to the drawings and initially to FIGS. 1 and 2, a wheel assembly for long-arm garden shears in accordance with the preferred embodiment of the present invention comprises a main body 40, two wheels 50, two positioning shafts 60, and two retaining rods 70.

Figure 3:
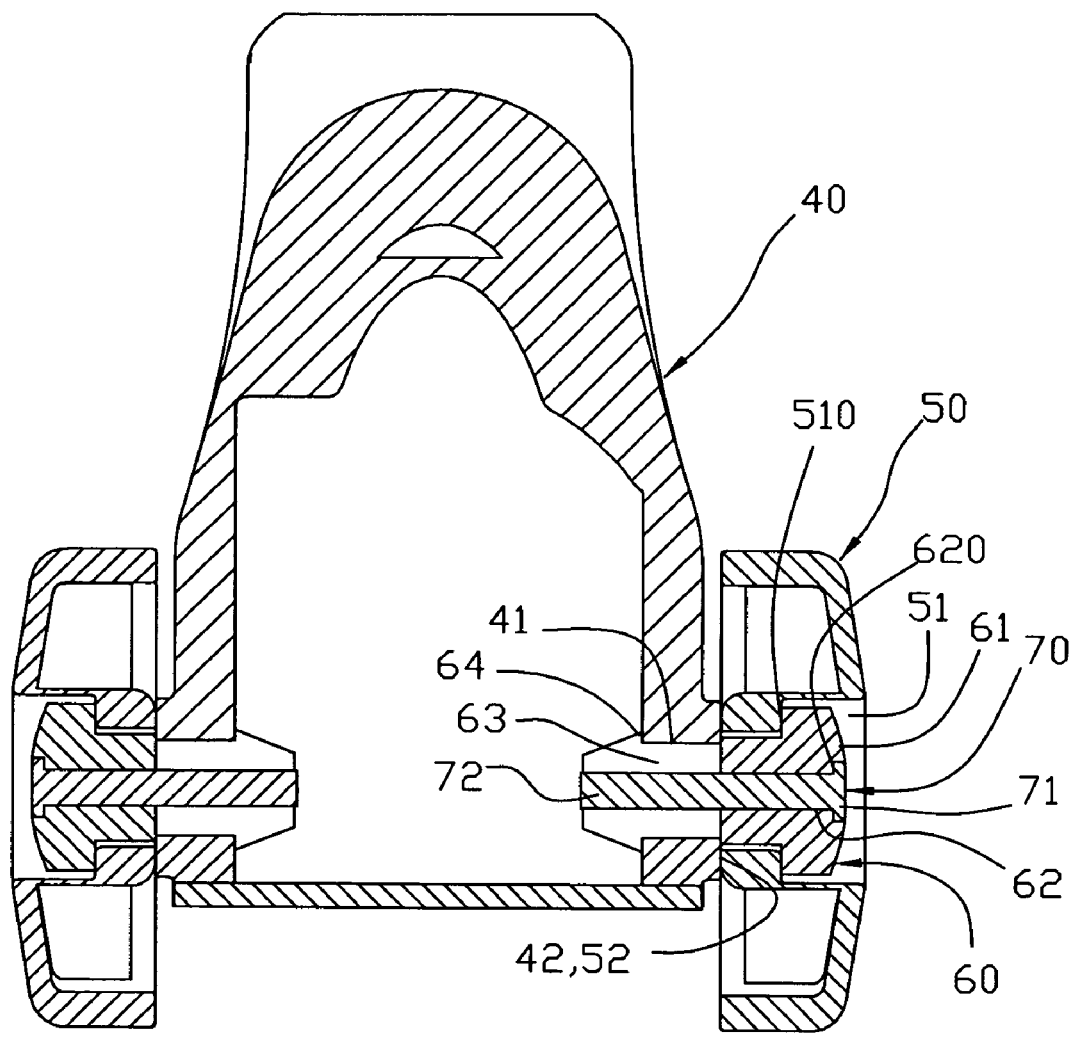
FIG. 3 is a plan cross-sectional assembly view of the wheel assembly as shown in FIG. 2.
Figure 4:
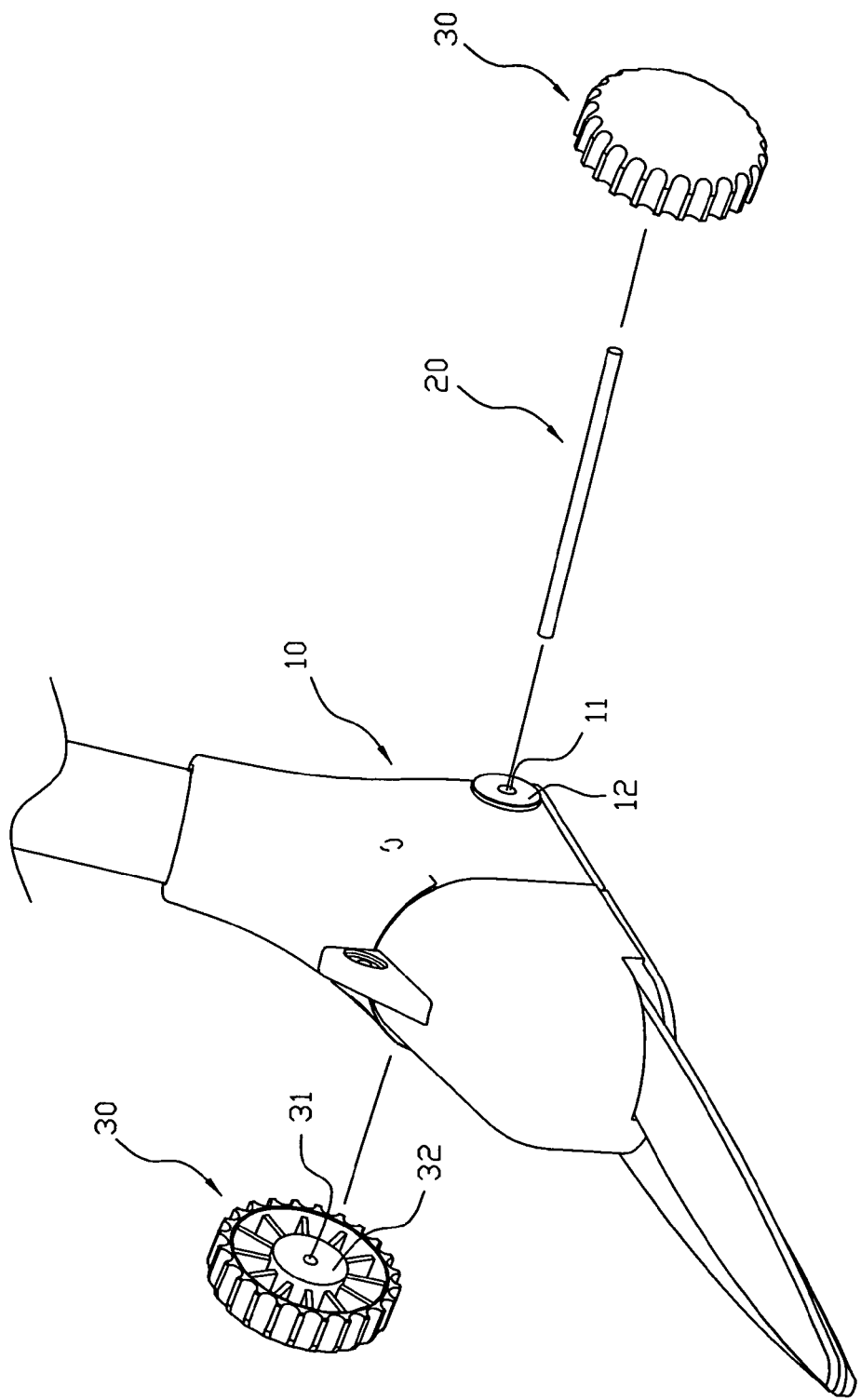
FIG. 4 is an exploded perspective view of a conventional wheel assembly for garden shears in accordance with the prior art.
Figure 5:
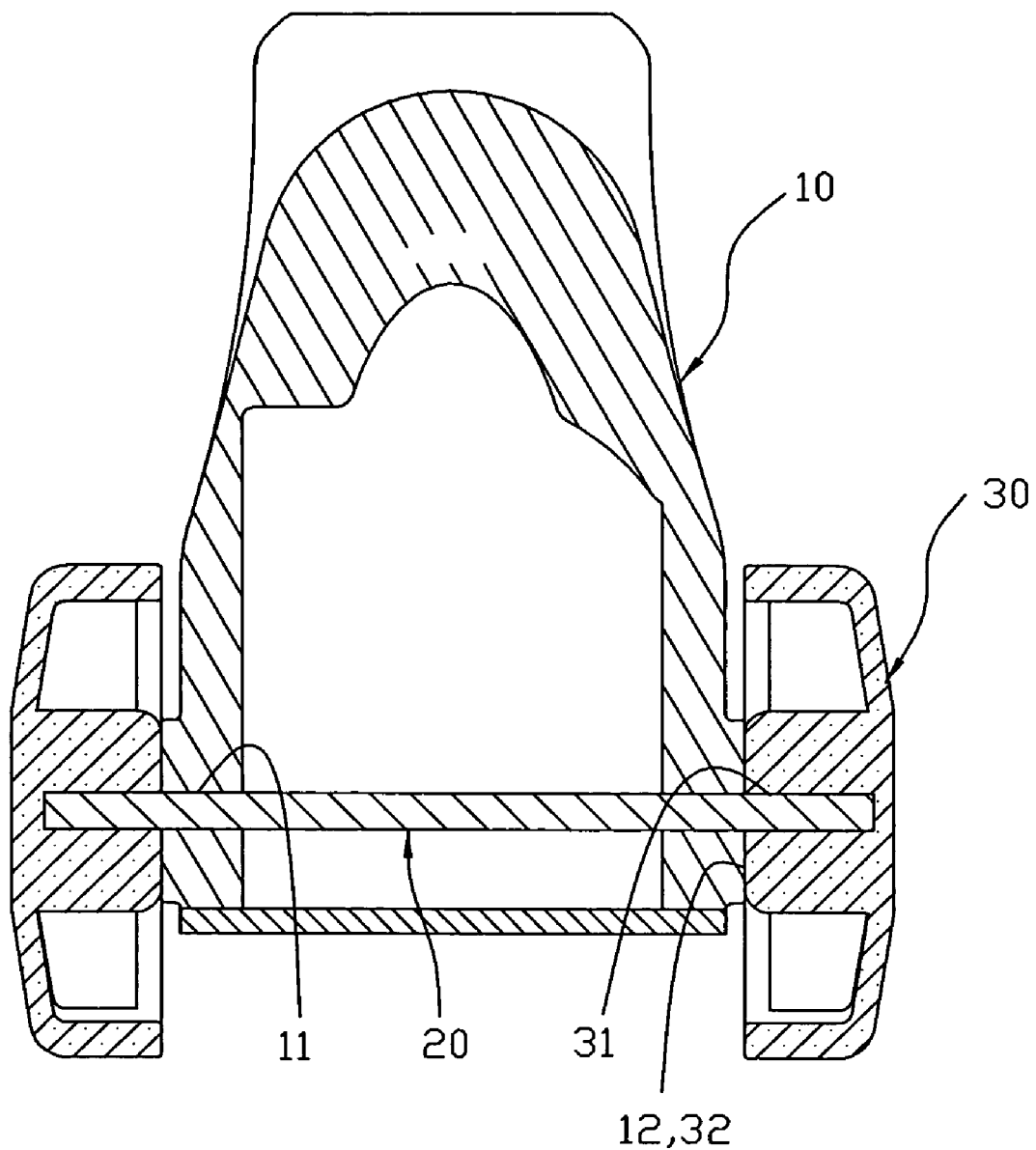
FIG. 5 is a plan cross-sectional assembly view of the conventional wheel assembly as shown in FIG. 4.

Referring to FIGS. 1–3, the main body 40 is a hollow body and has two opposite sides each formed with a pivot hole 41 having an outer side formed with a protruding flat resting portion 42.

Each of the two wheels 50 is rotatably mounted on the main body 40 and has a center formed with a step-shaped positioning hole 51 aligning with a respective pivot hole 41 of the main body 40 and having an inner side formed with a protruding flat resting portion 52 rested on the resting portion 42 of the respective pivot hole 41 of the main body 40.

Each of the two positioning shafts 60 is mounted on a respective one of the two wheels 50 and is combined with the main body 40. Each of the two positioning shafts 60 has a first end formed with a plurality of spaced elastic positioning plates 63 each extended through the positioning hole 51 of the respective wheel 50 and the respective pivot hole 41 of the main body 40 and each having a distal end formed with a hook-shaped locking portion 64 locked on an inner side the respective pivot hole 41 of the main body 40 to lock each of the two positioning shafts 60 on the main body 40. The first end of each of the two positioning shafts 60 is formed with a plurality of slits 630 (see FIG. 2) located between the positioning plates 63, so that the positioning plates 63 are flexible. Each of the two positioning shafts 60 has a second end formed with an enlarged limit head 61 mounted in the positioning hole 51 of the respective wheel 50 and rested on a shoulder 510 (see FIG. 3) of the positioning hole 51. Each of the two positioning shafts 60 has an inside formed with a step-shaped limit hole 62 axially extended through a whole length of each of the two positioning shafts 60 and communicating with the slits 630.

Each of the two retaining rods 70 is mounted in a respective one of the two positioning shafts 60 to press each of the two positioning shafts 60 on the main body 40. Each of the two retaining rods 70 is mounted in the limit hole 62 of the respective positioning shaft 60 and has a first end formed with a retaining portion 72 closely urged on the positioning plates 63 of the respective positioning shaft 60 to closely position the locking portion 64 of each of the positioning plates 63 on the inner side the respective pivot hole 41 of the main body 40 so as to lock each of the two positioning shafts 60 on the main body 40. Preferably, the retaining portion 72 of each of the two retaining rods 70 is a circular shaft and has a diameter slightly greater than that of the limit hole 62 of the respective positioning shaft 60. Each of the two retaining rods 70 has a second end formed with an enlarged stop portion 71 mounted in the limit hole 62 of the respective positioning shaft 60 and rested on a shoulder 620 (see FIG. 3) of the limit hole 62.

Accordingly, the retaining portion 72 of each of the two retaining rods 70 is urged on the positioning plates 63 of the respective positioning shaft 60 to closely position the locking portion 64 of each of the positioning plates 63 on the inner side the respective pivot hole 41 of the main body 40 so as to lock each of the two positioning shafts 60 on the main body 40, so that each of the two wheels 50 is attached on the main body 40 rigidly and stably, thereby preventing the two wheels 50 from detaching from the main body 40 during a long-term utilization. In addition, each of the two wheels 50 is attached on the main body 40 by limit of the respective positioning shaft 60, so that each of the two wheels 50 is rotatable on the main body 40 smoothly and conveniently. Further, the two wheels 50 are respectively attached on the main body 40 in an independent manner, so that the two wheels 50 will not interfere with each other when the main body 40 is turned, thereby facilitating movement of the main body 40.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A wheel assembly, comprising a main body, two wheels, and two positioning shafts, wherein:
   the main body has two opposite sides each formed with a pivot hole;
   each of the two wheels is rotatably mounted on the main body and has a center formed with a step-shaped positioning hole;
   each of the two positioning shafts is mounted on a respective one of the two wheels and is combined with the main body;
   each of the two positioning shafts has a first end formed with a plurality of elastic positioning plates each extended through the positioning hole of the respective wheel and the respective pivot hole of the main body and each having a distal end formed with a hook-shaped locking portion locked on an inner side the respective pivot hole of the main body to lock each of the two positioning shafts on the main body;
   the wheel assembly further comprises two retaining rods each mounted in a respective one of the two positioning shafts to press each of the two positioning shafts on the main body;
   each of the two retaining rods has a first end formed with a retaining portion urged on the positioning plates of the respective positioning shaft to position the locking portion of each of the positioning plates on the inner side the respective pivot hole of the main body so as to lock each of the two positioning shafts on the main body;
   the first end of each of the two positioning shafts is formed with a plurality of slits located between the positioning plates;
   each of the two positioning shafts has an inside formed with a step-shaped limit hole axially extended through a whole length of each of the two positioning shafts and communicating with the slits, and each of the two retaining rods is mounted in the limit hole of the respective positioning shaft.

2. The wheel assembly in accordance with claim 1, wherein the main body is a hollow body.

3. The wheel assembly in accordance with claim 1, wherein the pivot hole of the main body has an outer side formed with a protruding flat resting portion, and the positioning hole of each of the two wheels has an inner side formed with a protruding flat resting portion rested on the resting portion of the respective pivot hole of the main body.

4. The wheel assembly in accordance with claim 1, wherein the positioning hole of each of the two wheels is aligning with a respective pivot hole of the main body.

5. The wheel assembly in accordance with claim 1, wherein each of the two positioning shafts has a second end formed with an enlarged limit head mounted in the positioning hole of the respective wheel and rested on a shoulder of the positioning hole.

6. The wheel assembly in accordance with claim 1, wherein the retaining portion of each of the two retaining rods is a circular shaft and has a diameter greater than that of the limit hole of the respective positioning shaft.

7. The wheel assembly in accordance with claim 1, wherein each of the two retaining rods has a second end formed with an enlarged stop portion mounted in the limit hole of the respective positioning shaft and rested on a shoulder of the limit hole.

* * * * *